(12) United States Patent
Garrabrant et al.

(10) Patent No.: US 11,162,719 B2
(45) Date of Patent: Nov. 2, 2021

(54) ELECTRONIC EXPANSION VALVES HAVING MULTIPLE ORIFICE PLATES

(71) Applicant: Stone Mountain Technologies, Inc., Johnson City, TN (US)

(72) Inventors: Michael A. Garrabrant, Unicoi, TN (US); Roger E. Stout, Unicoi, TN (US); Christopher M. Keinath, Johnson City, TN (US); Matthew C. Blaylock, Johnson City, TN (US); Paul E. Glanville, Chicago, IL (US)

(73) Assignee: Stone Mountain Technologies, Inc., Johnson City, TN (US)

( * ) Notice: Subject to any disclaimer, the term of this patent is extended or adjusted under 35 U.S.C. 154(b) by 346 days.

(21) Appl. No.: 16/316,588

(22) PCT Filed: Jul. 7, 2017

(86) PCT No.: PCT/US2017/041024
§ 371 (c)(1),
(2) Date: Jan. 9, 2019

(87) PCT Pub. No.: WO2018/013410
PCT Pub. Date: Jan. 18, 2018

(65) Prior Publication Data
US 2020/0182520 A1 Jun. 11, 2020

Related U.S. Application Data

(60) Provisional application No. 62/361,588, filed on Jul. 13, 2016.

(51) Int. Cl.
*F25B 41/31* (2021.01)
*F16K 1/38* (2006.01)
(Continued)

(52) U.S. Cl.
CPC .............. *F25B 41/31* (2021.01); *F16K 1/385* (2013.01); *F16K 31/046* (2013.01); *F25B 41/35* (2021.01);
(Continued)

(58) Field of Classification Search
CPC .......... F25B 41/31; F25B 41/35; F25B 41/39; F25B 41/385; F25B 2600/2513; F16K 31/046; F16K 1/385; Y02B 30/70
See application file for complete search history.

(56) References Cited

U.S. PATENT DOCUMENTS

| 1,645,601 A | 10/1927 | Lee |
| 2,437,577 A | 3/1948 | Williams |

(Continued)

FOREIGN PATENT DOCUMENTS

| JP | 47-36015 U | 12/1972 |
| JP | H10-205927 A | 8/1998 |

(Continued)

OTHER PUBLICATIONS

The Extended European Search Report dated Feb. 13, 2020, of counterpart European Application No. 17828196.0.
(Continued)

*Primary Examiner* — Larry L Furdge
(74) *Attorney, Agent, or Firm* — DLA Piper LLP (US)

(57) ABSTRACT

An electronic expansion valve (EEV) is operated by a motor controlling a variable restriction valve in which a liquid refrigerant enters at a high pressure and exits at a reduced pressure. The motor controls the depth of a tapered needle which, as extended, penetrates multiple fixed orifices, aligned in series. Additional fixed orifices, downstream of the fully extended needle, provide further restriction and management of refrigerant flashing. Depending on the desired operating range, the following elements may be
(Continued)

controlled: needle length, diameter, and taper; diameter, thickness, and relative elevation of each orifice; response and maximum torque provided by the motor; and geometry of the valve enclosed volume.

9 Claims, 4 Drawing Sheets

(51) Int. Cl.
    *F16K 31/04*       (2006.01)
    *F25B 41/35*       (2021.01)
    *F25B 41/39*       (2021.01)
    *F25B 41/385*     (2021.01)

(52) U.S. Cl.
    CPC ............. *F25B 41/385* (2021.01); *F25B 41/39* (2021.01); *F25B 2600/2513* (2013.01)

(56) References Cited

U.S. PATENT DOCUMENTS

| | | | |
|---|---|---|---|
| 4,383,416 A | 5/1983 | Phillips | |
| 4,556,193 A * | 12/1985 | Yoshiga | F25B 41/31 251/129.11 |
| 4,718,243 A | 1/1988 | Buschulte et al. | |
| 5,364,066 A | 11/1994 | Dorste et al. | |
| 6,148,631 A | 11/2000 | Watanabe et al. | |
| 6,332,328 B1 | 12/2001 | Bangheri | |
| 9,115,814 B2 * | 8/2015 | Sun | F16K 1/42 |
| 2008/0282717 A1 | 11/2008 | Yukimoto | |
| 2009/0183520 A1 | 7/2009 | Yukimoto | |
| 2015/0362236 A1 | 12/2015 | Jiang et al. | |

FOREIGN PATENT DOCUMENTS

| | | |
|---|---|---|
| JP | 2002-071241 A | 3/2002 |
| JP | 2005-69644 A | 3/2005 |
| JP | 2005-351605 A | 12/2005 |
| JP | 2006-266667 A | 10/2006 |
| JP | 2006-308274 A | 11/2006 |
| JP | 2010-43727 A | 2/2010 |

OTHER PUBLICATIONS

Office Action dated May 1, 2020, of counterpart Korean Application No. 10-2019-7004224, along with an English translation.

Notice of Reasons for Refusal dated Jan. 28, 2020, of counterpart Japanese Application No. 2019-501476, along with an English translation.

Examination Report No. 1 dated Jul. 3, 2019, of counterpart Australian Application No. 2017297293.

* cited by examiner

ELECTRONIC EXPANSION VALVES HAVING MULTIPLE ORIFICE PLATES

TECHNICAL FIELD

This disclosure relates to expansion devices used to regulate and control the flow of a fluid from a high pressure to a low pressure.

BACKGROUND

Expansion devices are used to regulate and control the flow of a fluid from a high pressure to a low pressure. More specifically, for refrigeration and heat pump systems, expansion devices regulate and control the flow of a refrigerant into the evaporator by reducing the pressure from the high-pressure side (condenser) to the low-pressure side (evaporator). Expansion devices range from non-active devices (orifice discs, capillary tubes and the like) to active devices (thermal expansion valves, pressure and motor driven and the like) and solenoid valves (proportional and on/off). Non-active expansion devices are sized for a specific operating point and, therefore, provide non-controlled performance at off-design conditions. Active expansion devices react to changing operating conditions and, therefore, act to maintain higher performance over a wider range of operating conditions.

A common type of active expansion device used for refrigeration and heat pump systems is a thermal expansion valve (commonly referred to as a "TEV" or "TXV"). Typical thermal expansion valves include either a tapered needle that travels through a single fixed orifice disc or a valve body that moves toward or away from a fixed valve seat. The valve works to maintain a constant refrigerant temperature rise through the evaporator (often referred to as superheat or glide). The position of the needle or valve body in relation to the orifice or seat is controlled by the pressure of a gas contained in a bulb working against a spring force. The bulb is normally in contact with (i.e., strapped tightly to) a tube containing a refrigerant exiting the evaporator. As the temperature of the refrigerant exiting the evaporator rises, the gas pressure in the bulb increases, acting to move the needle or valve such that the flow of refrigerant is increased. Conversely, as refrigerant temperature exiting the evaporator decreases, the pressure in the bulb decreases, acting to move the needle or valve such that the flow of refrigerant is decreased.

The type of gas in the bulb must be carefully selected from its pressure versus temperature curve so that the desired valve control characteristics are obtained. These types of valves have the advantage of being low cost, but often do not provide desired performance at operating conditions far from the design point and are often slow to react due to the need to transfer heat to and from the bulb via conduction through a small metal-to-metal contact area. Performance may be erratic due to inconsistent valve stem or needle movement (such as becoming temporarily stuck due to debris or wear) and gas bulbs are limited to a single superheat or glide set-point such that different superheats or glides cannot be specified for different operating conditions or at system start-up.

Electronic expansion valves (EEV) utilize an electric motor (most often a stepper motor) to directly move a needle or valve in relation to an orifice or seat. Movement and position of the motor is determined by an electronic controller in relationship to a measured evaporator outlet temperature, superheat or glide, or evaporator temperature and pressure. Because the position of the valve is directly controlled by the motor instead of indirectly via a pressure-spring force interaction, EEV's can provide more reliable and repeatable system performance. Additionally, the controller can be programmed to provide different superheats or glides at different operating conditions (or at start-up) so that system performance is controlled over a wider range of operating conditions.

Another type of EEV utilizes a solenoid valve that opens and closes in relation to the desired superheat or glide. Instead of a continuous flow of refrigerant to the evaporator, an on/off solenoid EEV provides "pulsed" flow into the evaporator. To maintain adequate solenoid life, the number of on/off cycles for a given time period is limited, normally to one on/off cycle every six seconds. For large systems having large evaporators and a large amount of refrigerant contained inside the evaporator, this long time constant does not normally impact system performance. However, for small systems with small evaporators, the time constant may be similar to or larger than the time it takes for the refrigerant to travel through the evaporator. This causes the evaporator to either have too much or not enough refrigerant at any given time, negatively impacting system performance.

For small systems where the refrigerant flow rate is very low, the physical dimensions of the needle-orifice or valve-seat pair necessarily become very small to provide a high enough flow restriction (and pressure drop). Manufacturing very small tapered needles, valves, orifices and seats is difficult and requires very tight tolerances to achieve repeatable performance. That results in high manufacturing costs. Additionally, very small orifices and valve-seats are prone to blockage due to even small amounts of debris in the system.

The problem is exacerbated for small systems operating over a very wide range of conditions such as ambient temperature and heated water temperatures. Wide operating ranges result in wide differential pressures across the expansion valve and a wide range of optimum refrigerant flow rates.

One example is an ammonia-water absorption heat pump water heater that utilizes ammonia as the refrigerant. Ammonia has a very high enthalpy of vaporization. This results in higher heat pump capacities per unit of refrigerant flow compared to standard CFC or HCFC refrigerants (such as R12, R22 or R134a). For a residential domestic water heating application, a typical ammonia flow rate is on the order of only about 8 lbm/hr. The high-side pressure is a function of the heated water temperature, which can range from cold (e.g., less than about 50° F.) to very hot (e.g., about 140° F.). The low-side pressure is a function of the ambient air temperature, which can range from cool (e.g., about 35° F.) to hot (e.g., about 125° F.). As a result, the differential pressure across the expansion valve can range from low (e.g., about 50 psi) to high (e.g., about 350 psi). Additionally, for maximum system performance, the desired refrigerant flow rate is highest when the differential pressure is low, and lowest when the differential pressure is high.

Accordingly, there remains a need for an expansion suitable to adjust the flow rate of fluids, particularly refrigeration fluids where the refrigeration/heat pump system requires low mass flow rates and a wide range of differential pressures between the high side (condensing) and low side.

SUMMARY

We provide an electronic expansion valve assembly comprising a valve body, a tapered needle positioned in the valve body, a motor-driven linear-drive assembly configured to move the needle along a needle extension pathway through the valve body, the needle extension pathway extending between a retracted position and an extended position of the needle, and a plurality of orifice plates having orifices arranged in series along the needle extension pathway.

DETAILED DESCRIPTION

Figure 1:
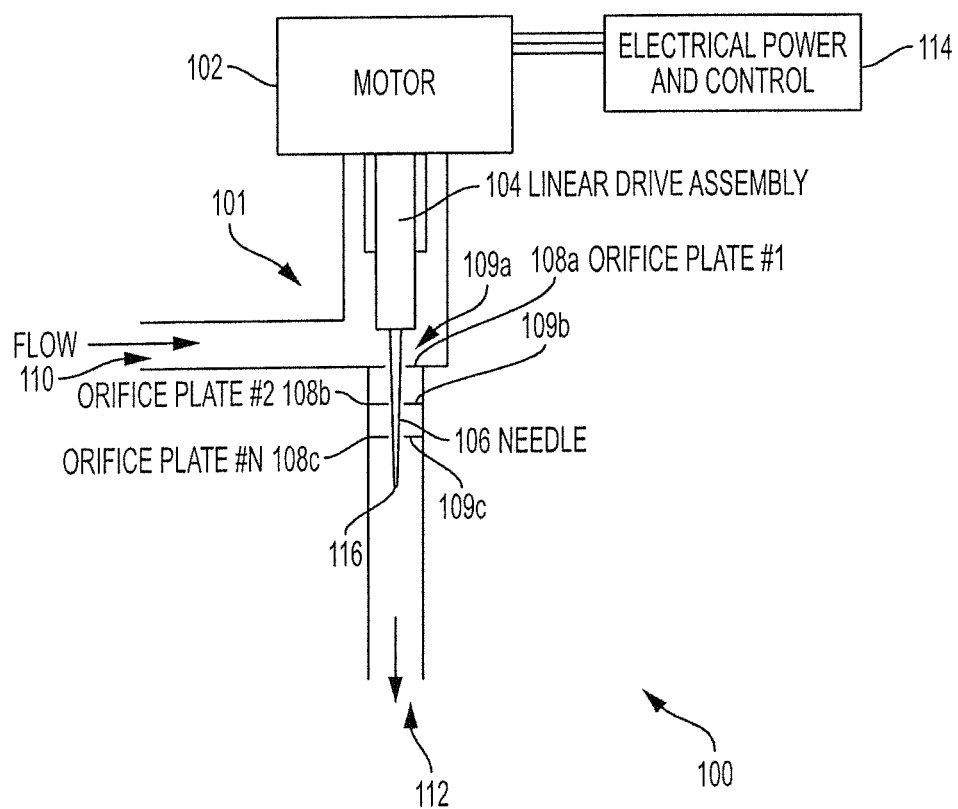
FIG. 1 depicts an exemplary expansion valve of this disclosure with the needle in the extended position.

It will be appreciated that the following description is intended to refer to specific examples of structure selected for illustration in the drawings and is not intended to define or limit this disclosure, other than in the appended claims.

This disclosure relates to expansion valves that can advantageously provide robust control of refrigerant flow in processes where normal operation includes low mass flow/ high pressure drop and high mass flow/low pressure drop conditions. The expansion valves can provide a higher pressure loss and wider operating range for a given flow rate than a valve that utilizes only a single orifice, without decreasing the physical size of the needle or orifice (resulting in a lower flow coefficient). Thus, the expansion valves are advantageously useful to adjust the flow rate of fluids, particularly refrigeration fluids where the refrigeration/heat pump system requires low mass flow rates and a wide range of differential pressures between the high side (condensing) and low side (evaporator).

Another advantage of our expansion valves is to provide a compact, low cost valve that utilizes physical components that are easily manufacturable at a low cost.

Still another advantage of our expansion valves is to provide a reliable valve that provides control of a refrigerant at low mass flow rates over a wide range of operating conditions.

Yet another advantage of our expansion valves is to provide a valve that manages the location of refrigerant flashing to non-critical areas of the valve.

Due to the optionally compact nature of the expansion valves of this disclosure, those advantages can be realized with a small footprint.

An exemplary motor-driven electronic expansion valve 100 is shown in FIG. 1. The electronic expansion valve 100 of FIG. 1 comprises of a valve body 101, a motor 102, a linear drive assembly 104, a tapered needle 106, and a motor controller 114. The valve body comprises an inlet 110 and outlet 112 for the flow of a fluid (or gas or combination thereof) through the valve body 101. The fluid, such as a refrigerant, for example, enters the valve body 101 though the inlet 110 at a high pressure and exits through the outlet 112 at a reduced pressure.

The needle 106 may be tapered such that the diameter increases from the tip 116 of the needle 106 to the base of the needle 106 along the entire shaft of needle 106 or just a portion thereof. The needle 106 is mounted on the linear drive assembly 104 and positioned in the valve body 101.

Electrical energy and control signals from the motor controller 114 operate to cause motor 102 to drive the linear drive assembly 104, which converts rotational movement of motor 102 to linear movement of the needle 106. The motor 102 is preferably a stepper motor.

Figure 2:
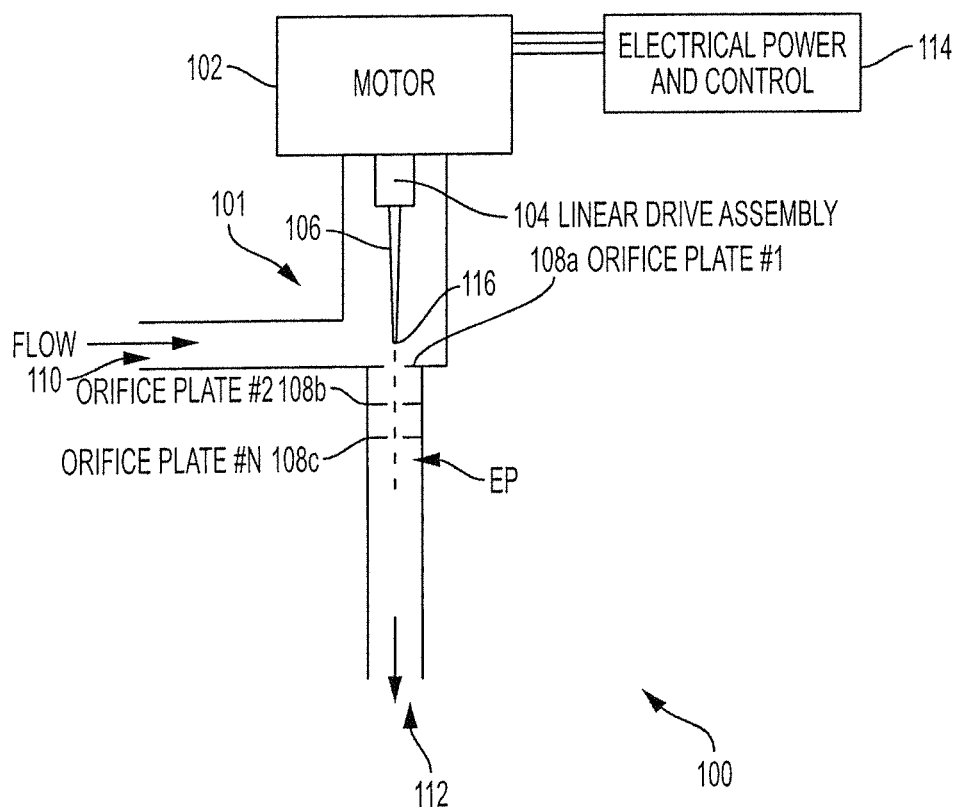
FIG. 2 depicts the exemplary expansion valve of FIG. 1 with the needle in the retracted position.

The linear drive assembly 104 is configured to adjust the linear position of the needle 106 along a needle extension pathway (dashed line indicated by "EP" in FIG. 2). As seen from comparison of FIG. 1 and FIG. 2, the needle extension pathway EP extends linearly with the needle 106 between a retracted position and an extended position of the needle 106. FIG. 1 depicts the needle 106 in the extended position and FIG. 2 depicts the needle 106 in the retracted position. The motor controller 114 is configured to determine and adjust a linear position of the needle 106 at any point along the needle extension pathway EP.

FIGS. 1 and 2 show that the electronic expansion valve 100 comprises a plurality of orifice plates 108 fixed to the interior chamber of the valve body 101 in series along the needle extension pathway EP. Each orifice plate 108 comprises at least one orifice 109, preferably, centered in the orifice plate 108.

The orifice plates 108 are arranged in the valve body 101 so that the orifices 109 are arranged in series along the needle extension pathway EP. A first fixed orifice plate 108a comprising orifice 109a is shown at an upstream position along the needle extension pathway EP. Additionally, the electronic expansion valve 100 of FIGS. 1 and 2 also comprises a second fixed orifice plate 108b and optional additional orifice plate(s) 108c, each having respective orifices 109b and 109c. Like the orifice 109a of orifice plate 108a, orifices 109b and 109c are positioned in series along the needle extension pathway EP, but orifices 109b and 109c are further downstream along the needle extension pathway EP than orifice 109a.

The number of additional orifice plates 108c is represented as N. N may be equal to 0, 1, 2, 3, 4 or more.

The shape and diameter of the orifices 109 may be the same or different provided that the diameter of an orifice in the needle extension pathway EP is shaped and sized to allow at least a tip 116 of the needle 106 to pass through the orifice 109. Preferably, the orifices 109 are centered within orifice plates 108 and, more preferably, aligned with the needle extension pathway EP to allow the needle 106 to pass through the orifices 109. However, other configurations are possible.

When the linear drive assembly 104 is operated by signal from motor controller 114 to move the needle 106 from the retracted position to the extended position (i.e., downward relative to the orientation of FIG. 2), the tip 116 of needle 106 passes through and at least partially obstructs the orifice 109a of first orifice plate 108a. When the needle 106 passes through the orifice plate 109a, the resulting annular flow area between the needle 106 and the orifice 109a is small, providing a high pressure loss, or low fluid flow.

If the desired high pressure loss is obtained by obstructing or partially obstructing orifice 109a of the first orifice plate 108a, the linear drive assembly 104 may stop extending the needle 106 after it passes through the first fixed orifice plate 108a and before reaching the fully extended position. Alternatively, if further high pressure loss is desired, the linear drive assembly 104 may be operated to move the needle 106 additionally through orifice 109b of the second fixed orifice plate 108b to at least partially obstruct orifice 109b. Additionally, if desired, the fluid flow may be even further reduced by passing the needle 106 through additional orifices 109c of one or more additional orifice plate 108c. The highest pressure loss is obtained when the needle 106 is fully extended along the needle extension pathway EP. Alternatively, if low pressure loss is desired, it can be obtained by controlling the linear drive assembly 104 to retract the needle 106 so that it does not obstruct orifice 109c or a combination of orifice 109c and one or both of orifices 109a and 109b.

Figure 3:
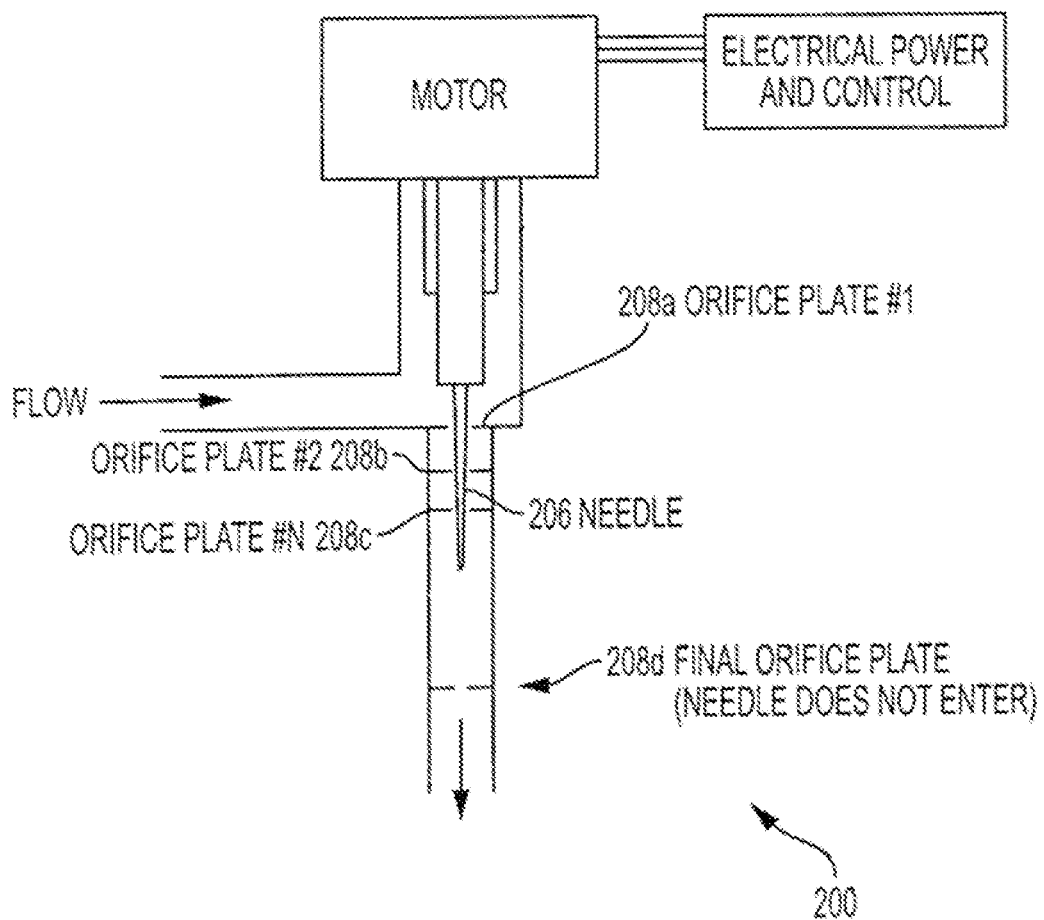
FIG. 3 depicts an alternative exemplary expansion valve of this disclosure with an orifice positioned downstream of the needle's reach.

FIG. 3 shows an alternative example of an electronic expansion valve 200. Like the motor driven needle valve 100, motor driven needle valve 200 comprises a first orifice plate 208a, a second orifice plate 208b and at least one optional additional orifice plate 208c with respective orifices 209a, 209b and 209c arranged linearly with the needle 206 in the needle extension pathway EP. However, in the electronic expansion valve 200, an additional final orifice plate 208d is located downstream of the needle extension pathway EP such that the needle 206 does not enter orifice 209d when fully extended. This final orifice plate 208d or "final restriction" may have a single or multiple orifices orifice 209d. Additionally, since the needle 106 does not pass through the orifice 209d, the orifice 209d may or may not be linearly aligned with the needle extension pathway EP.

The final orifice plate 208d slightly reduces the operating range of the electronic expansion valve 200, but provides a lower limit on the pressure loss for a given flow rate, regardless of the needle position. Therefore, the benefit of the final orifice plate 208d is to limit the flow rate of the fluid flowing through the valve, even if the needle 206 is fully retracted. For PID (proportional—integral—derivative) controlled valves, this benefit allows the use of more aggressive control parameters without fear that an undesirably high flow rate could occur if the needle is retracted too far. An additional benefit of the final orifice plate 208d is to manage the location of flashing (from liquid to vapor) that often occurs during the final stage of expansion (last few psi of pressure loss).

EXAMPLES

Pressure loss through an orifice can be described by equation (1), where Cv is the flow coefficient based on the orifice design, SG is the specific gravity of the fluid, and dP is the differential pressure loss. As Cv decreases, pressure loss (dP) increases for a given flow rate.

$$dP = SG/(\text{Flow} \cdot Cv)^2 \quad (1)$$

For a motor driven needle valve having only a single orifice plate, Cv is a function of the linear needle position in relation to the fixed orifice. When the needle is fully extended, Cv is low and when the needle is fully retracted, Cv is high. Table 1 shows dP calculated for a constant flow and SG of a single-orifice needle valve with Cv ranging from 0.05 (needle fully extended) to 0.5 (needle fully retracted). The resulting pressure loss is 4 to 400 depending on the position of the needle.

In contrast to a valve with a single orifice plate, when two flow restriction orifices are used in series, as in our electronic expansion valves, higher pressure losses are obtained for a given flow rate. The effective flow coefficient (Kv) for two or more restrictions in series (each with a $Cv_N$) can be determined by equation (2):

$$Kv = [(1/Cv_1^2) + (1/Cv_2^2) + (1/Cv_3^2) + \ldots + (1/Cv_N^2)]^{(-0.5)} \quad (2)$$

In Table 2, the calculated pressure loss for a fixed flow and SG is shown for a needle valve having two orifice plates. Like Table 1, Cv in Table 2 ranges from 0.05 (needle fully extended) to 0.5 (needle fully retracted). For Table 2, Cv for each orifice is assumed to be equal for any given needle position. The maximum pressure loss for the two-orifice valves is twice that compared to the single-orifice valve (800 vs. 400), and the operating range is nearly doubled (792 vs. 396), without decreasing the physical size of the needle or orifice (same Cv).

TABLE 1

One Variable Cv Restriction

| Flow | Cv | dP |
|---|---|---|
| 1 | 0.05 | 400 |
| 1 | 0.1 | 100 |
| 1 | 0.15 | 44 |
| 1 | 0.2 | 25 |
| 1 | 0.25 | 16 |
| 1 | 0.3 | 11 |
| 1 | 0.35 | 8 |
| 1 | 0.4 | 6 |
| 1 | 0.45 | 5 |
| 1 | 0.5 | 4 |

TABLE 2

Two Variable Cv Restrictions

| Flow | Cv1 | Cv2 | Kv | dP |
|---|---|---|---|---|
| 1 | 0.05 | 0.05 | 0.035 | 800 |
| 1 | 0.1 | 0.1 | 0.071 | 200 |
| 1 | 0.15 | 0.15 | 0.106 | 89 |
| 1 | 0.2 | 0.2 | 0.141 | 50 |
| 1 | 0.25 | 0.25 | 0.177 | 32 |
| 1 | 0.3 | 0.3 | 0.212 | 22 |
| 1 | 0.35 | 0.35 | 0.247 | 16 |
| 1 | 0.4 | 0.4 | 0.283 | 13 |
| 1 | 0.45 | 0.45 | 0.318 | 10 |
| 1 | 0.5 | 0.5 | 0.354 | 8 |

As stated above, Table 2 assumes that Cv through each orifice is the same for a given needle position. However, by adjusting the orifice diameters, linear location of the orifice, and/or diameter/taper of the needle, different Cv's can be obtained for a given needle position, allowing the designer to tailor the valve characteristics and performance to a specific application.

As another example, the calculated pressure loss for a fixed flow and SG is shown for a needle valve having three orifices in Table 3. For simplicity, Cv for each orifice is assumed to be equal for any given needle position. The maximum pressure loss for the three-orifice valve is three times that compared to the single-orifice valve (1200 vs. 400), and the operating range is tripled (1188 vs. 396), without decreasing the physical size of the needle or orifice (same Cv).

Additionally, for most refrigerants, a small amount of flashing (from liquid to vapor) often occurs during the final stage of expansion (last few psi of pressure loss), depending on how sub-cooled the liquid refrigerant is before entering the expansion valve. Flashing from liquid to vapor can cause erosion of metal surfaces near the flashing location such as orifices and needles. Careful sizing of the final orifice can provide for most or all of the flashing to occur at or just downstream of the final orifice, protecting the primary needle-orifice restrictions from erosion, improving valve reliability.

Table 4 shows the calculated pressure loss for a given flow and SG of needle valve with two orifices located within the needle extension pathway (again assuming Cv for each orifice is the same for a given needle position), plus a third "fixed" orifice located downstream of the first two, and outside the range of the needle extension pathway. While the operating range is reduced compared to the three variable Cv case (Table 3), the range is equivalent to the two variable Cv case (Table 2), while providing a higher maximum pressure loss (978 vs. 800) and a higher minimum pressure loss (186 vs. 8).

TABLE 4

Two Variable + One Fixed Cv Restrictions

| Flow | Cv1 | Cv2 | Cv3 | Kv | dP |
|---|---|---|---|---|---|
| 1 | 0.05 | 0.05 | 0.075 | 0.032 | 978 |
| 1 | 0.1 | 0.1 | 0.075 | 0.051 | 378 |
| 1 | 0.15 | 0.15 | 0.075 | 0.061 | 267 |
| 1 | 0.2 | 0.2 | 0.075 | 0.066 | 228 |
| 1 | 0.25 | 0.25 | 0.075 | 0.069 | 210 |
| 1 | 0.3 | 0.3 | 0.075 | 0.071 | 200 |
| 1 | 0.35 | 0.35 | 0.075 | 0.072 | 194 |
| 1 | 0.4 | 0.4 | 0.075 | 0.072 | 190 |
| 1 | 0.45 | 0.45 | 0.075 | 0.073 | 188 |
| 1 | 0.5 | 0.5 | 0.075 | 0.073 | 186 |

TABLE 3

Three Variable Cv Restrictions dP Flow

| | Cv1 | Cv2 | Cv3 | Kv | dP |
|---|---|---|---|---|---|
| 1 | 0.05 | 0.05 | 0.05 | 0.029 | 1200 |
| 1 | 0.1 | 0.1 | 0.1 | 0.058 | 300 |
| 1 | 0.15 | 0.15 | 0.15 | 0.087 | 133 |
| 1 | 0.2 | 0.2 | 0.2 | 0.115 | 75 |
| 1 | 0.25 | 0.25 | 0.25 | 0.144 | 48 |
| 1 | 0.3 | 0.3 | 0.3 | 0.173 | 33 |
| 1 | 0.35 | 0.35 | 0.35 | 0.202 | 24 |
| 1 | 0.4 | 0.4 | 0.4 | 0.231 | 19 |
| 1 | 0.45 | 0.45 | 0.45 | 0.260 | 15 |
| 1 | 0.5 | 0.5 | 0.5 | 0.289 | 12 |

Figure 4:
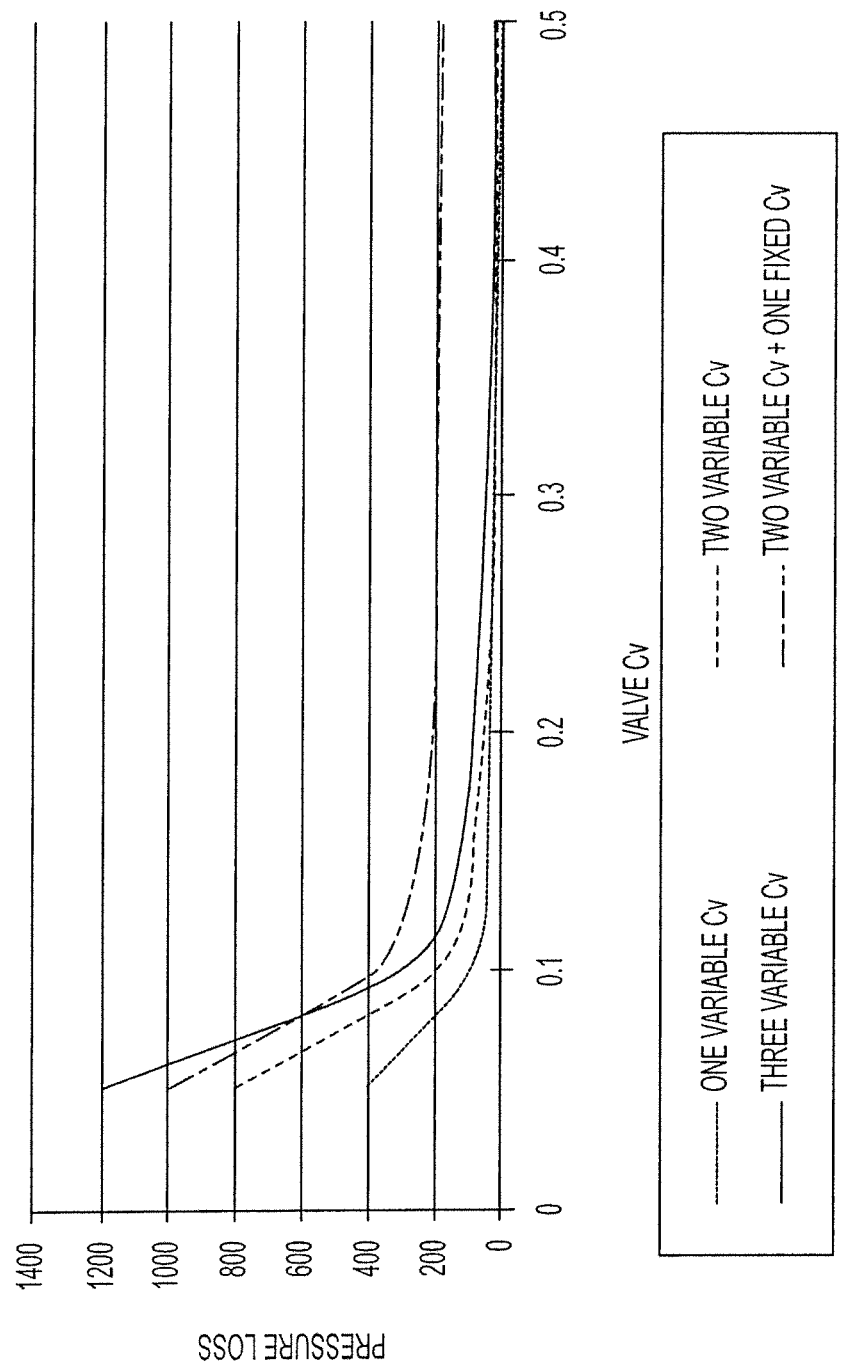
FIG. 4 depicts a graph showing the relationship between the pressure loss and flow coefficient (Cv) for the expansion valves analyzed in Tables 1-4.

The results of pressure loss and flow coefficient shown in Tables 1 through 4 are shown graphically in FIG. 4.

What is claimed is:

1. An electronic expansion valve assembly comprising:
a valve body having an inlet and an outlet,
a continuously tapered needle positioned in the valve body that decreases in diameter in a direction of flow through the valve,
a motor-driven linear-drive assembly configured to move the needle along a needle extension pathway through the valve body, the needle extension pathway extending between a retracted position and an extended position of the needle, and
a plurality of orifice plates fixed to the valve body and having a gap therebetween, each having an orifice arranged in series along the needle extension pathway and a diameter of a first orifice in the direction of flow is greater than a diameter of a last orifice in the direction of flow,
wherein the needle passes through at least two of the orifices as the needle is moved from the retracted position to the extended position.

2. The electronic expansion valve assembly of claim 1, wherein the electronic expansion valve assembly comprises three or more orifice plates having orifices arranged in series in the needle extension pathway.

3. The electronic expansion valve assembly of claim 1, further comprising at least one orifice plate positioned downstream of the needle extension pathway.

4. The electronic expansion valve assembly of claim 1, further comprising a controller configured to determine and adjust a linear position of the needle along the needle extension pathway.

5. The electronic expansion valve assembly of claim 1, wherein the motor is a stepper motor.

6. The electronic expansion valve assembly of claim 1, wherein the plurality of orifice plates are fixed to the valve body.

7. The electronic expansion valve assembly of claim 1, wherein each orifice plate of the plurality of orifice plates has only one orifice.

8. The electronic expansion valve assembly of claim 1, wherein the needle is tapered from base to tip.

9. The electronic expansion valve assembly of claim 1, wherein a liquid refrigerant enters the inlet at a high pressure and exits the outlet at a reduced pressure.

* * * * *